Feb. 26, 1963   D. E. ATKINSON   3,079,596
ACOUSTIC LEVEL SENSING SYSTEM
Filed March 17, 1960

DUANE E. ATKINSON
INVENTOR.

BY
Flehr and Swain
ATTORNEYS

United States Patent Office 3,079,596
Patented Feb. 26, 1963

3,079,596
ACOUSTIC LEVEL SENSING SYSTEM
Duane E. Atkinson, 102 Fey Drive, Burlingame, Calif.
Filed Mar. 17, 1960, Ser. No. 15,578
5 Claims. (Cl. 340—244)

This invention relates to level sensing systems generally, and more particularly to those level sensing systems which utilize acoustic absorption.

In the process of filling or emptying containers, it is often desirable to know when a predetermined level has been reached. Many devices have been utilized to determine when a certain level of liquid has been attained. By way of illustration, such devices have utilized scales and floats. Such devices, however, have been highly impractical in the field of determining when a preselected level has been attained in a container holding aggregates such as gravel or sand. The weight of such aggregates makes the use of scales highly impractical. The nature of the aggregate denies the use of a float.

It is, therefore, a general object of this invention to provide a novel level determining means.

It is a more particular object of this invention to provide a level determining means capable of determining the level of an aggregate as well as the level of liquids.

It is a further object of this invention to provide a level indicator which utilizes the principle of acoustic absorption.

It is still a further object of this invention to provide a level indicator which employs a feedback system to determine that a particular level has been reached.

Figure 2:
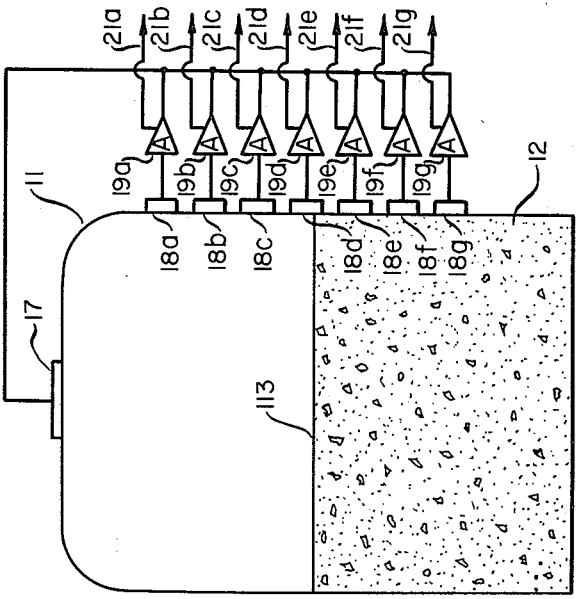
Figure 1:
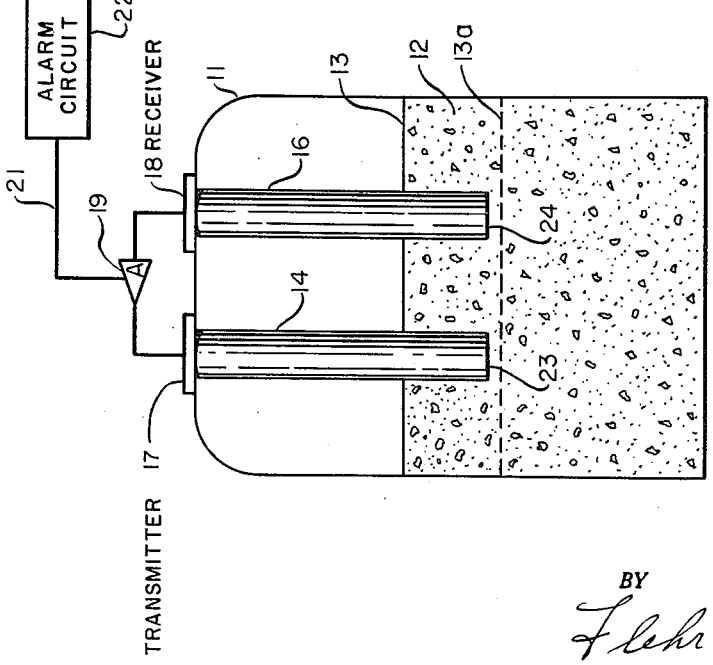

These and other objects of the invention will become more clearly apparent upon a reading of the following description in conjunction with the accompanying drawing in which:

FIGURE 1 is a cross-sectional view of a container in accordance with one embodiment of the invention; and FIGURE 2 is a cross-sectional view of a container in accordance with another embodiment of the invention.

Referring to FIGURE 1, a container 11 is filled with an aggregate 12 to a level 13. Affixed to the top of the container 11 are the hollow tubes 14 and 16 which extend downwardly into the container. A speaker or other sound transmitting device 17 is affixed at the top of the tube 14 while a microphone or other sound sensing device 18 is mounted at the top of the tube 16. The output of an amplifier 19 is connected to the sound transmitting device 17, while the input of the amplifier 19 is connected to the sound sensing device 18. A second output 21 of the amplifier 19 is connected to an alarm circuit 22.

The gain of the amplifier 19 is adjusted such that the amplifier is near oscillation. In practice, the amplifier may be adjusted to motor-boat without feedback. When the level 13 of the aggregate is above the ends 23 and 24 of the tubes 14 and 16, the acoustic loop between the sound transmitting device 17 and the sound sensitive device 18 is minimized by the acoustic absorption of the aggregate 12.

As the container is emptied, however, and the level decreases to 13a, the ends 23 and 24 of the tubes 14 and 16 are exposed. Under this condition, the acoustic loop between the sound transmitting device 17 and the sound sensing device 18 is complete. Since the amplifier 19 is adjusted nearly to oscillation, the completed acoustic loop between the sound transmitter 17 and the sound sensing device 18 will cause the amplifier 19 to oscillate. The oscillation causes an output on the line 21 to an alarm device 22. The alarm device 22 may be a bell or light or other convenient means to indicate that the level of the aggregate 12 is at 13a or the device 22 may cause an additional operation such as refilling the container 11.

Rather than have the tubes 14 and 16 extended downwardly into the container 11 as shown in FIGURE 1, they may be drawn to or cut off near the top of the container 11 so as to be capable of indicating when the container is full. With this arrangement, the amplifier 19 will oscillate while the container 11 is being filled, but will cease oscillation when the aggregate level goes above the ends of the tube. In this embodiment, it should be realized that once the amplifier is in oscillation it will be hard to cut off. Consequently, the tubes should be spaced to allow the aggregate to extend above the ends of the tubes and not to merely contact them.

In another embodiment of the invention, only one of the tubes 14 or 16 may be extended to the preselected level while the other tube may be omitted whereby either the sound transducing device 17 or the sound sensing device 18 may be directly connected to the wall of the container 11 without a tube.

Referring to FIGURE 2, another embodiment of the invention is shown. The sound transmitting device 17 is attached to the top of the container 11. A series of sound sensitive devices 18a–18g, each having its own output line 21a–21g connected to an identical alarm, are affixed to the side wall of the container at spaced vertical intervals.

The operation of this embodiment is similar to that of FIGURE 1. When the level 113 of the aggregate is below a particular sound sensing device such as 18a–18d in the drawing, oscillation occurs in the associated amplifiers 19a–19d. Due to the acoustic absorption of the aggregate 12, the amplifiers 19e–19g will not oscillate. With this arrangement, several levels of the aggregate can be determined. Still another variation of the invention is apparent in placing not only the sound sensing devices but the sound transmitting device on the side wall of the container.

While the operation of the embodiments shown has been in conjunction with aggregates in a container, the device could equally well be used with liquids.

I claim:

1. A material body detecting system comprising an amplifier having input and output means, a first acoustical transducing means for forming acoustical waves having an input connected to the output of said amplifier to be energized thereby, second acoustical transducing means having an output connected to the input of said amplifier to provide an input signal thereto, said second acoustical transducing means being spaced from the first and arranged to receive the acoustical waves to provide an acoustical path between the first and second acoustical transducing means, said acoustical path including a body of air adjacent at least one of said transducing means throughout the operation of the system, said amplifier, acoustical transducing means and acoustical path forming a closed system, the gain in said closed system being adjusted whereby when the path between the first and second acoustical transducing means is free of said material object the acoustical waves transmitted by the first acoustical transducing means are received by the second transducing means with sufficient amplitude so that the gain of the system is above that required to oscillate and when the acoustical path is interrupted by said material body the acoustical waves transmitted by the first acoustical transducing means and received by the second are attenuated by the material so that the gain of the system is below that required for oscillation.

2. A system as in claim 1 wherein the gain of said amplifier is selected to maintain the system near oscillations.

3. A system as in claim 1 wherein means are provided for deriving an output signal indicative of the state of the system.

4. A material body detecting system comprising an amplifier having input and output means, a first acoustical transducing means for forming acoustical waves having an input connected to the output of said amplifier to be energized thereby, a second acoustical transducing means having an output connected to the input of said amplifier to provide an input signal thereto, said second acoustical transducing means being spaced from the first and arranged to receive the acoustical waves to provide an acoustical path between the first and second acoustical transducing means, said acoustical path including a body of air adjacent at least one of said transducing means throughout the operation of the system, means for adjusting the gain of said amplifier so that the system is near oscillation, said amplifier, acoustical transducing means and acoustical path forming a closed system, said system having a gain whereby it oscillates when the path between the first and second transducer is free of said material body so that the acoustical waves transmitted by the first acoustical transducing means are received by the second transducing means with sufficient amplitude that the gain of the system is above that required to oscillate and when the acoustical path is interrupted by a material body the acoustical waves transmitted by the first acoustical transducing means and received by the second are attenuated by material so that the gain of the system is below that required for oscillation, and means for deriving a signal which is indicative of the state of the system.

5. A system for sensing the level of material in a container comprising an acoustic feedback loop including an amplifier having input and output terminals, an acoustic wave transmitting device connected to the output terminals of said amplifier and an acoustic wave sensing device connected to the output terminals of said amplifier and an acoustic wave sensing device connected to the input terminals of said amplifier, said transmitting device and sensing device being spaced from one another and arranged to form an acoustic path between the same, said acoustic path including a body of air adjacent at least one of said devices throughout the operation of the system, said acoustic path being intercepted by said material at one level in the container and said path being free from said material at another level, the gain of said acoustical feedback loop being adjusted so that it is near oscillation when the acoustic path is intercepted by said material and the acoustic waves are attenuated by the material and is oscillatory when the path is free from said material.

References Cited in the file of this patent

UNITED STATES PATENTS

| | | |
|---|---|---|
| 2,277,037 | Clark et al. | Mar. 24, 1942 |

FOREIGN PATENTS

| | | |
|---|---|---|
| 958,776 | Germany | Feb. 21, 1957 |
| 809,681 | Great Britain | Mar. 4, 1959 |
| 813,497 | Great Britain | May 21, 1959 |
| 218,900 | Australia | Nov. 21, 1958 |

(Duplicate of British Patent 813,497.)